United States Patent [19]

Sumner

[11] 4,411,410
[45] Oct. 25, 1983

[54] APPARATUS FOR CUTTING OPENINGS IN PIPES

[76] Inventor: Joe D. Sumner, 105 Larry Lee Dr., Kerrville, Tex. 78028

[21] Appl. No.: 452,945

[22] Filed: Dec. 27, 1982

[51] Int. Cl.³ .............................................. B23K 7/04
[52] U.S. Cl. ..................................... 266/54; 266/70; 266/72
[58] Field of Search ............................. 266/54, 70, 72

[56] References Cited

U.S. PATENT DOCUMENTS

| | | | |
|---|---|---|---|
| 1,826,164 | 10/1931 | Carrier, Jr. et al. | 266/54 |
| 2,464,901 | 3/1949 | Sturm | 266/70 |
| 2,497,853 | 2/1950 | Arnold et al. | 266/54 |
| 2,545,666 | 3/1951 | Lonngren | 266/54 |
| 3,388,901 | 6/1968 | Ferguson | 266/54 |
| 3,451,666 | 6/1969 | Evans | 266/54 |

*Primary Examiner*—W. Stallard
*Attorney, Agent, or Firm*—Gunn, Lee & Jackson

[57] ABSTRACT

A mechanism is provided for torch cutting openings in pipes wherein the openings are dimensioned according to the size of other pipes to be connected by welding at the opening. The mechanism comprises a frame structure which is adapted to be secured in immovable relation to the pipe in which the opening is to be cut and wherein the frame structure supports locator means which establishes an axis of rotation relative to the pipe about which an opening is to be cut. The apparatus incorporates a pipe contour tracking mechanism which is efficiently adjusted for the size of the pipe opening to be cut and the size of the pipe in which the opening is to be cut. For each 360° rotation of the cutting torch, the pipe contour tracking mechanism induces two-cycle linear oscillation of the torch, thus causing the cutting tip of the torch to be maintained in accurately spaced relation with the surface of the pipe as the torch is revolved 360° about its axis of rotation during the hole cutting operation. The cutting torch is thus efficiently tracked relative to the pipe for optimum cutting without any guiding contact with the pipe itself.

32 Claims, 16 Drawing Figures

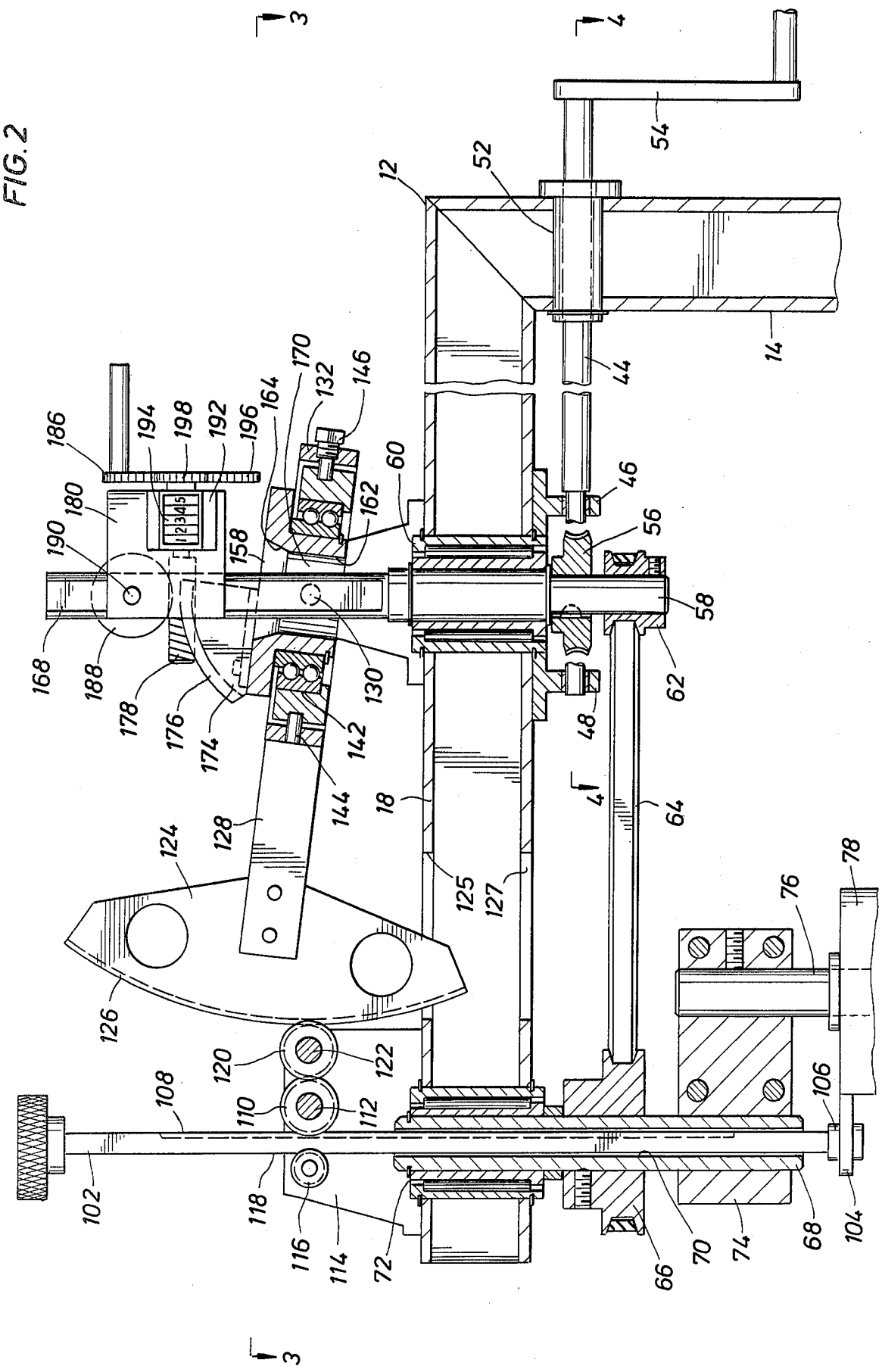

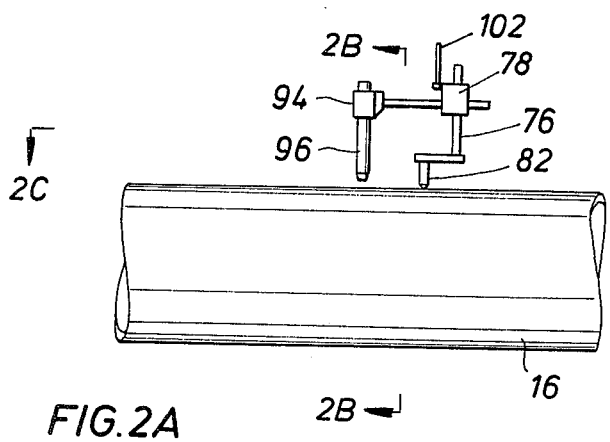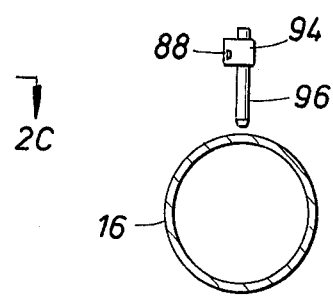
FIG.2A  FIG.2B
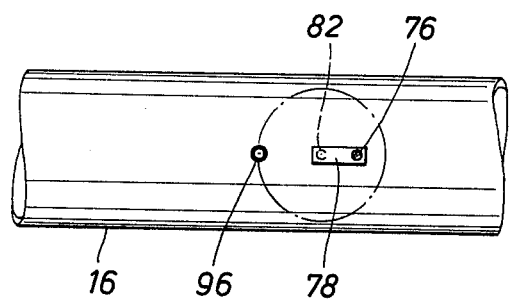
FIG.2C
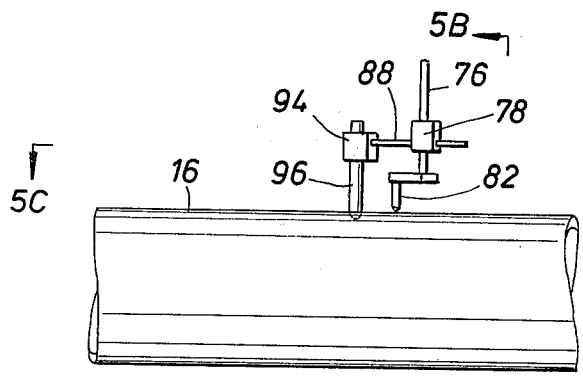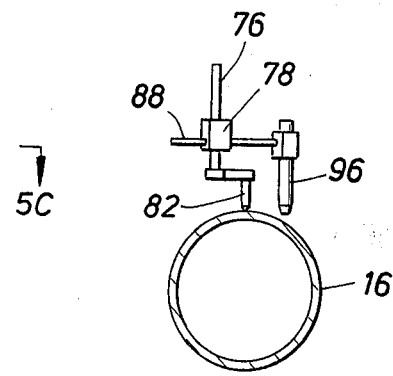
FIG.5A  FIG.5B
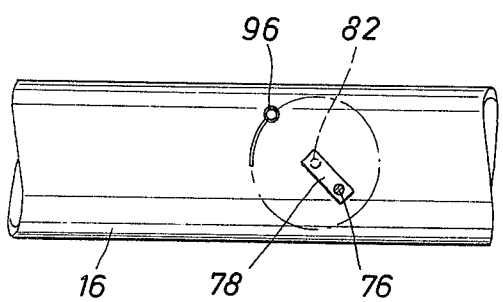
FIG.5C

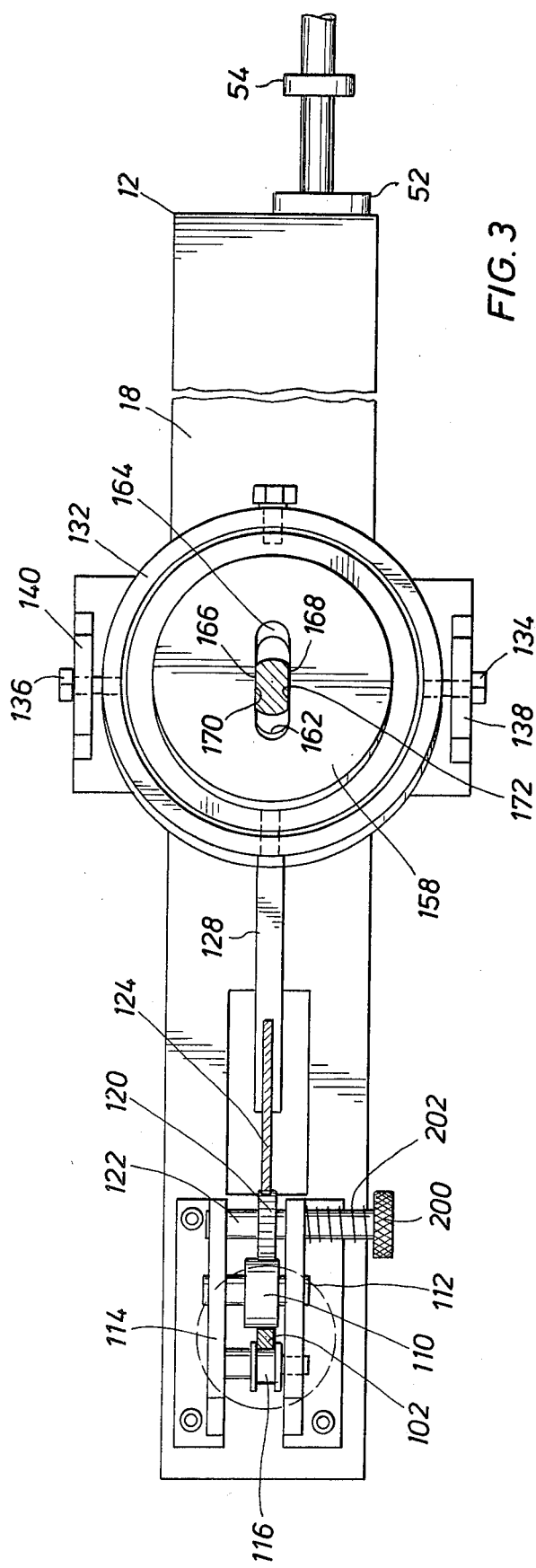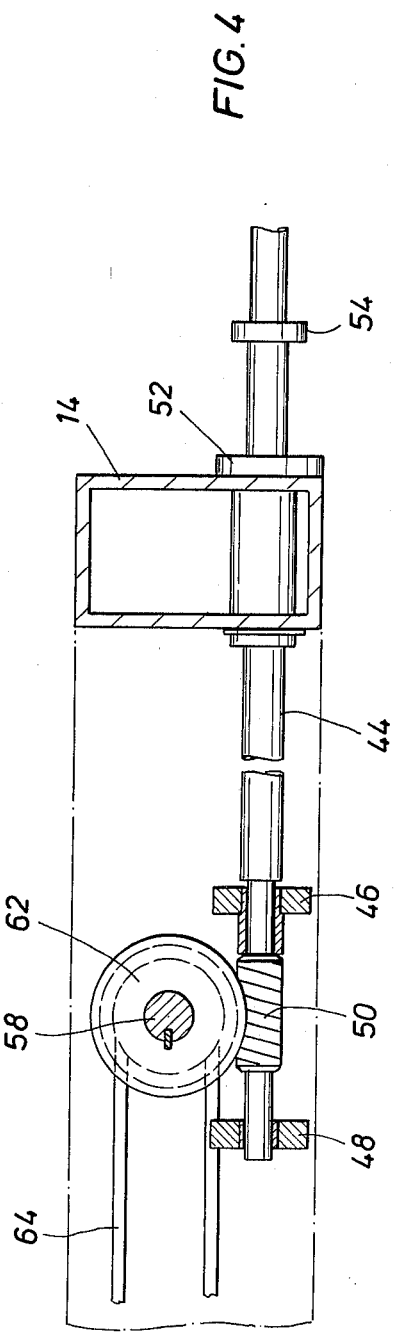

APPARATUS FOR CUTTING OPENINGS IN PIPES

FIELD OF THE INVENTION

This invention relates generally to apparatus for cutting openings in pipes and the like and adapting the pipe to receive other pipes of the same or different dimension in welded interconnected assembly therewith. More specifically, the present invention concerns lightweight portable apparatus which may be effectively utilized in a field environment and which may be simply and efficiently attached to a pipe for the purpose of cutting an opening therein. The apparatus also includes pipe contour tracking means permitting maintenance of accurate positioning of a cutting torch in cutting relationship with the pipe as the torch is revolved to cut an opening in the pipe.

BACKGROUND OF THE INVENTION

In the assembly of fluid flow controlling systems, pipes and other cylindrical objects are typically joined with other pipes by means of welding or by means of flanged joints which are bolted in assembly. This invention relates particularly to apparatus which is utilized for joining pipes, pressure vessels and other objects in interconnected assembly by means of welding.

Since pipes and other such objects are frequently joined in assembly by welding, most experienced welders have been taught to manually lay out and cut openings in pipes for the connection of other pipes thereto. In this case, welders also learn to prepare end preparation on the pipes to be joined, thus permitting the pipes to be placed in intimate, closely fitting relation to permit efficient welding. Manual layout of holes in pipes and end preparations for the pipes to be joined therewith is obviously a time consuming procedure and is thus considered sufficiently expensive as to be detrimental. For this reason, over the years, many mechanical devices have been developed for the purpose of achieving pipe opening layout and pipe end preparation. In some cases, the pipe cutting apparatus is guided on the outer surface of the pipe to achieve proper torch positioning and in other cases it is guided by cam induced systems to maintain accurate positioning of a cutting torch in relation with the outer surface of the pipe being cut.

THE PRIOR ART

In some cases, torch positioning for apparatus designed for cutting pipe openings is controlled by guide rollers which physically engage the outer surface of the pipe, such as taught in U.S. Pat. Nos. 2,866,631 and 3,741,556. Also, in many cases pipe opening cutting apparatus is of large and complex nature and is unsuitable for portable use in field conditions. Examples of pipe cutting apparatus of this nature is exemplified by U.S. Pat. Nos. 2,437,025; 4,053,145 and 3,726,516. Also, in many cases pipe cutting apparatus is controlled by cam devices which induce the cutting torch to accurately track the outer surface of the pipe as the torch is revolved. Obviously, when cam induced mechanisms are employed, separate cams must be provided for each size of pipe to be cut. Examples of such cam controlled pipe cutting apparatus is exemplified by U.S. Pat. Nos. 2,545,666; 2,623,285 and 3,388,901.

It is desirable therefore to provide apparatus for cutting openings in pipes which is of portable nature and can be readily used in a field environment and which is efficiently adapted to cut openings of varying sizes in pipes of varying sizes without requiring modification of the apparatus itself. It is also desirable to provide apparatus for cutting openings in pipes which is effectively controlled without requiring any guiding relationship with the outer surface of the pipe being cut.

In most devices for cutting openings in pipe, the cutting torch is arranged in such a manner that it always cuts toward the centerline of the pipe. This type of torch cutting develops a bevelled surface at the pipe opening which will not be in properly aligned registry with the surface of a pipe being joined at the opening. For this reason, misaligned surfaces may be defined at the intersecting passageways which can develop turbulence in fluid flow. It is desirable that pipe openings be cut with a torch being maintained in substantially parallel relation with the centerline about which the torch is rotated, thereby permitting development of a surface at the opening which will be in properly aligned registry with the inner surface of the pipe being joined, thus providing an inner passage surface configuration which has no tendency to develop turbulence in the flow of fluid passing through the pipes.

SUMMARY OF THE INVENTION

Among the several features of the present invention is contemplated the provision of novel apparatus for cutting openings in pipe which is of lightweight, portable nature and which can be efficiently transported in field operations and which may be quickly and efficiently brought into accurate assembly with a pipe in which an opening is to be cut.

In accordance with another feature of the present invention, a novel apparatus is provided for cutting openings in pipe which is capable of being simply and efficiently adjusted for cutting an opening of any selected size in a pipe of any selected diameter.

It is another feature of this invention to provide novel apparatus for cutting openings in pipe and other similar objects which is capable of maintaining a cutting torch in accurate cutting relation with the outer surface of the pipe being cut, without requiring any guiding relation with the outer surface.

It is an even further feature of the present invention to provide novel apparatus for cutting openings in pipe wherein openings are cut while maintaining a cutting torch in substantially parallel relation with the axis of torch rotation.

In accordance with the present invention, apparatus for cutting openings in pipes and other similar objects incorporates a frame structure having a quick disconnect mechanism for releasably locking the frame structure in substantially immovable relation with the pipe in which the opening is to be cut. The quick disconnect apparatus is designed to achieve precise orientation of the frame structure relative to the axis of the pipe to be cut, thus ensuring that the opening formed in the pipe is accurately oriented relative to the axis of the pipe and relative to the axis of the pipe to be joined thereto by welding. A pair of spindles is rotatably supported by the frame structure and are disposed in substantially parallel relation. One of these spindles is a tracking control spindle and the second spindle is a torch rotation drive spindle. Rotation inducing apparatus is interconnected with both of one spindles in such a manner as to cause simultaneous rotation of the them. The tracking control spindle however is arranged to rotate two revolutions for each single revolution of the torch rotation drive spindle.

The torch rotation drive spindle defines an elongated guide tube through which a tracking control rod extends in movable relation. The tracking control rod is formed to define rack teeth along at least a portion of the length thereof and is in driven relation with a gear train incorporating at least one pinion gear having teeth in mating relation with the rack teeth. A torch support block is secured in immovable relation to the torch rotation drive spindle and supports a torch guide post in offset relation with the axis of the drive spindle. At the lower portion of the torch guide post, a locator support element is provided which secures a locator element in accurately aligned relation with the axis of the torch rotation drive spindle.

A torch guide block is disposed in guided relation with the torch guide post and is secured to the tracking control rod and is therefore adapted for reciprocation relative to the torch guide post along with the tracking control rod. A torch guide block also supports a torch positioning arm in selectably positionable relation therewith. A torch fixture is supported at one end of the torch positioning arm and provides support for an oxyacetylene type torch which accomplishes the cutting operation.

The torch must move not only in circular manner but also in vertical manner in a controlled sequence that includes two cycles of vertical movement for each 360° revolution of the torch in order to accomplish accurate tracking of the surface of the pipe as the torch is rotated. To accomplish this controlled vertical oscillation during rotation of the torch, a translation arm is connected in pivotal relation with the tracking control spindle by means of a bearing and gimbal assembly. At one end of the translation arm is provided an arcuate rack head having rack teeth formed in arcuate manner thereon which rack teeth are disposed in engagement with the gear train which includes the pinion gear in driving relation with the rack teeth of the tracking control rod. Thus, as the tracking control spindle rotates the position of the bearing and gimbal assembly causes the translation arm to oscillate about its pivotal axial relationship with the axis of the tracking control spindle. Thus, the translation arm oscillates in pivotal manner with a two-cycle oscillation upon each 360° revolution of the torch rotation drive spindle. The translation arm thereby moves the arcuate rack head through two cycles of oscillation for each revolution of the torch rotation drive spindle, thus inducing two-cycle linear oscillation of the tracking control rod by virtue of its drive train interconnection with the arcuate rack head. The tracking control rod in turn moves the torch guide block, torch support arm and torch in two-cycle vertical oscillation for each 360° revolution of the torch rotation drive spindle. Thus, as the torch rotates one revolution, it is caused to move linearly through two cycles of linear movement. The result induced is that the tip of the torch is maintained in precisely spaced relation with the outer surface of the pipe to be cut during each revolution. A smooth torch cut is thereby formed. Since the torch is maintained in a position such that the flame exits in substantially parallel relation with the axis of rotation defined by the locator element and torch rotation drive spindle, the opening that is cut will be made in substantially coincident relation with the inner surface of the pipe to be joined by welding thereto. This feature facilitates optimum connection of the pipes and prevents any undesirable turbulence from developing in the fluid flowing through the pipes.

To enable the apparatus to cut openings in pipes of varying size for the purpose of receiving pipes of varying diameter, the tracking control mechanism is provided with means for selectively positioning the translation arm in appropriate angular relation relative to the tracking control spindle to thus permit the translation arm to vary its included angle of oscillatory movement in a manner corresponding to the size of the pipe in which the opening is to be cut. A precision adjustment mechanism is incorporated which achieves accurate positioning of the translation arm for any selected pipe size. The adjustment mechanism incorporates indicia which may be selected to ensure operating personnel that the mechanism is properly set for the particular pipe size involved.

Other and further features of the present invention will become apparent to one skilled in the art upon consideration of this entire disclosure. The form of the invention which will now be described in detail illustrates the general principles of the invention but is to be understood that this detailed description is not to be taken as limiting the scope of the present invention.

BRIEF DESCRIPTION OF THE DRAWINGS

So that the manner in which the above recited features of the present invention which will become apparent are attained and can be understood in detail, more particular description of the invention briefly summarized above may be had by reference to the embodiment thereof which is illustrated in the appended drawings, which drawings form a pat of this specification.

It is to be noted however that the appended drawings illustrate only a typical embodiment of this invention and are therefore not be considered limiting of its scope, for the invention may admit to other equally effective embodiments.

IN THE DRAWINGS

Figure 1:
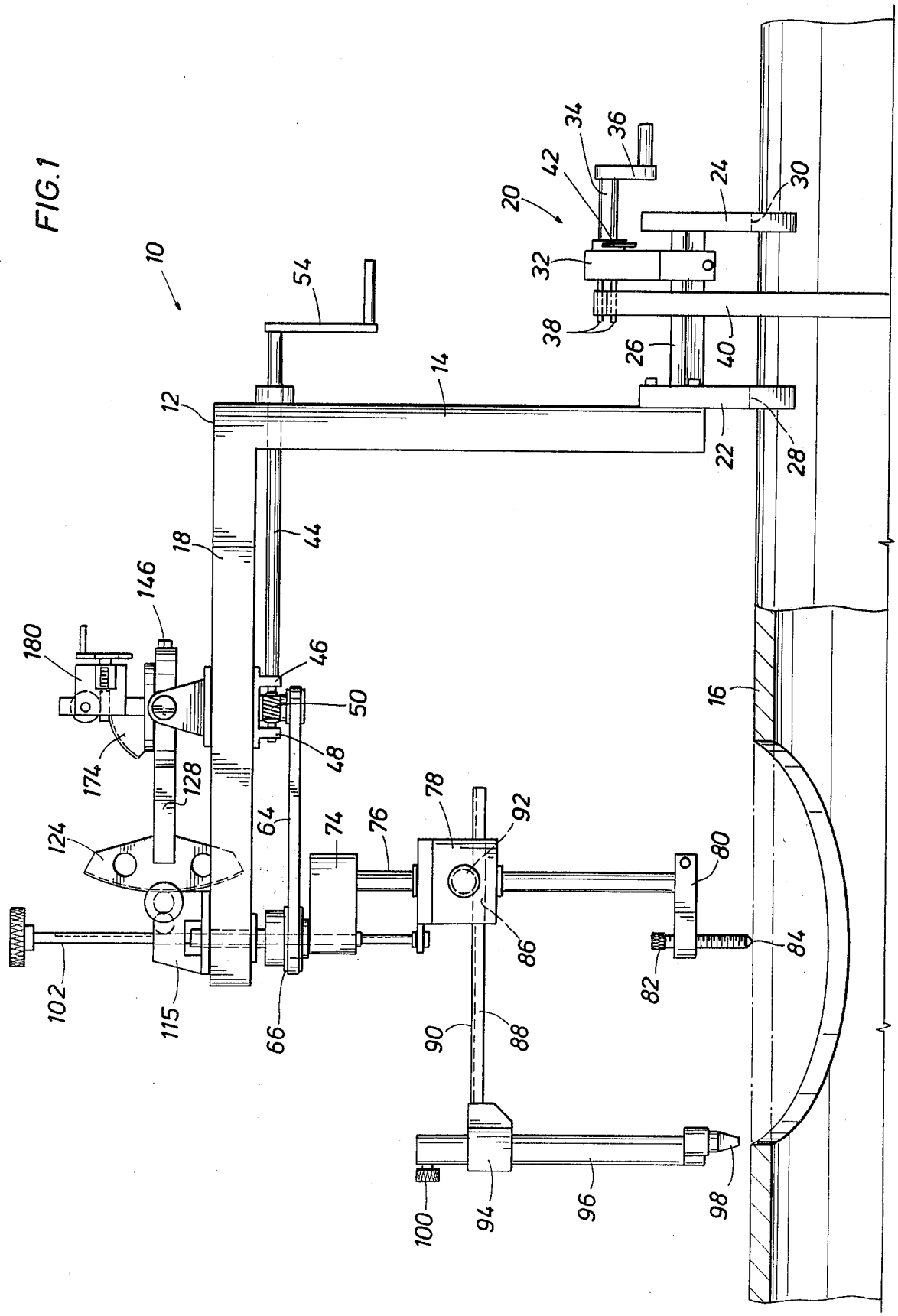

The present invention, both as to its organization and manner of operation, together with further features and advantages thereof may best be understood by way of illustration and example of a certain embodiment when taken in conjunction with the accompanying drawings in which:

FIG. 1 is an elevational view of a mechanism for torch cutting openings in pipes and other similar objects which is constructed in accordance with the present invention and is shown in assembly with a pipe with an opening having been cut therein.

FIG. 2 is a partial elevational view of the mechanism of FIG. 1 having portion thereof broken away and shown in section to thus illustrate the rotational control and pipe tracking control features thereof in detail.

FIG. 2A is an elevational view illustrating only the torch and torch rotational support apparatus of FIG. 1 shown in operative relation therewith.

FIG. 2B is a sectional view taken along line 2B—2B of FIG. 2A and showing the torch positioned in alignment with the vertical centerline of the pipe.

FIG. 2C is a sectional view taken along line 2C—2C in FIG. 2A which shows the torch and the torch rotational control and support apparatus and further shows in broken line the opening to be cut in the pipe upon rotation of the apparatus in the position set in FIG. 2A.

FIG. 3 is a plan view of the apparatus of FIG. 2 taken along line 3—3 of FIG. 2 and further illustrating portions of the apparatus in section.

FIG. 4 is a fragmentary section view taken along line 4—4 of FIG. 2.

Figure 5:
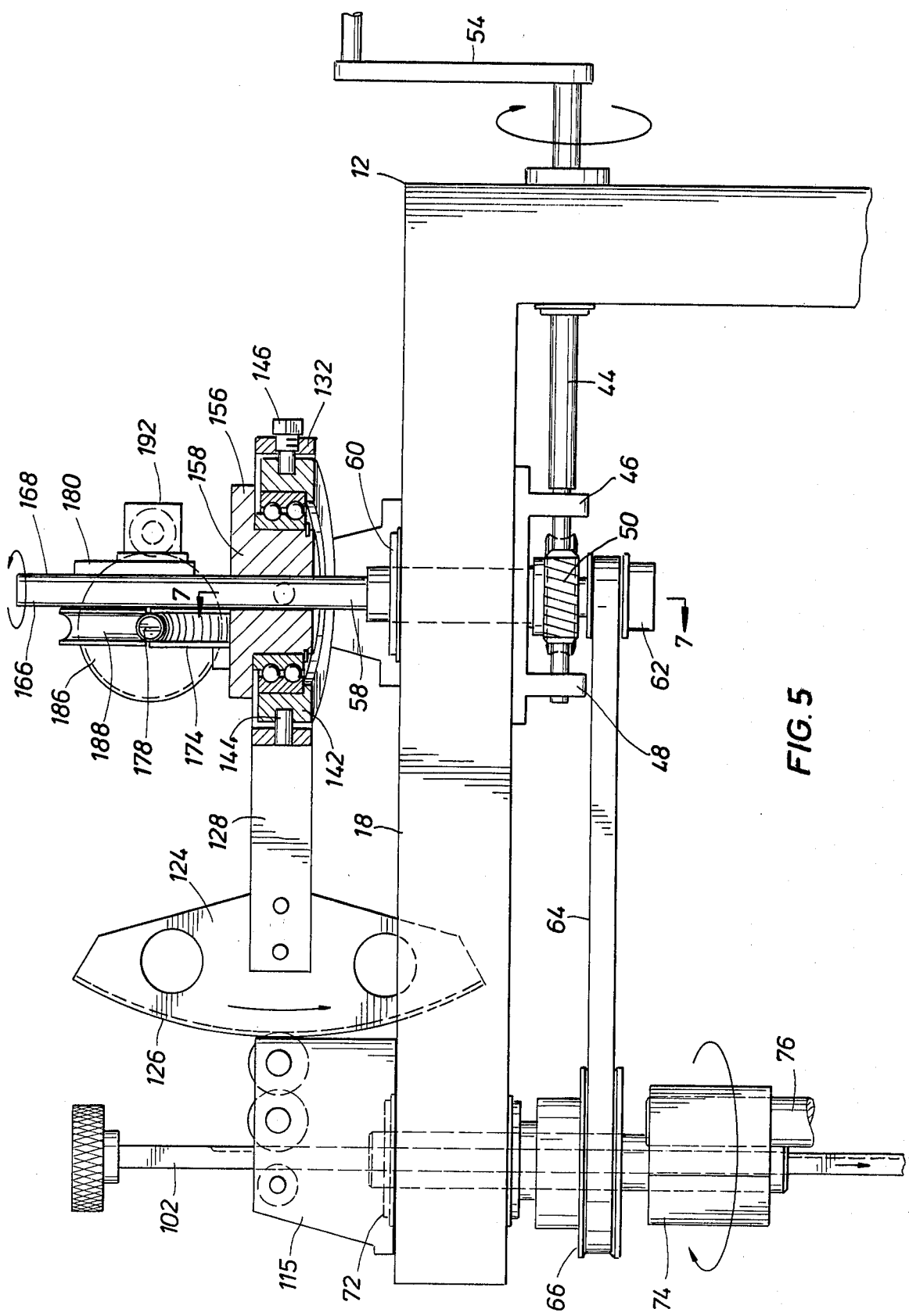

FIG. 5 is a partial elevational view of the upper portion of the apparatus of FIG. 1 having portions thereof broken away and shown in section and illustrating pipe tracking translational movement and torch rotational movement of the apparatus which is accomplished by rotation of a single drive shaft.

FIG. 5A is an elevational view of the torch and torch rotational support portion of the apparatus illustrating the position of the torch when the apparatus is in the position shown in FIG. 5.

FIG. 5B is a sectional view taken through the pipe along line 5B—5B of FIG. 5A, which view illustrates the position of the torch and torch rotational control apparatus when the apparatus is in the position shown in FIG. 5.

FIG. 5C is a view taken along line 5C—5C of FIG. 5A which further shows the position of the torch when the apparatus is positioned as shown in FIG. 5.

Figure 6:
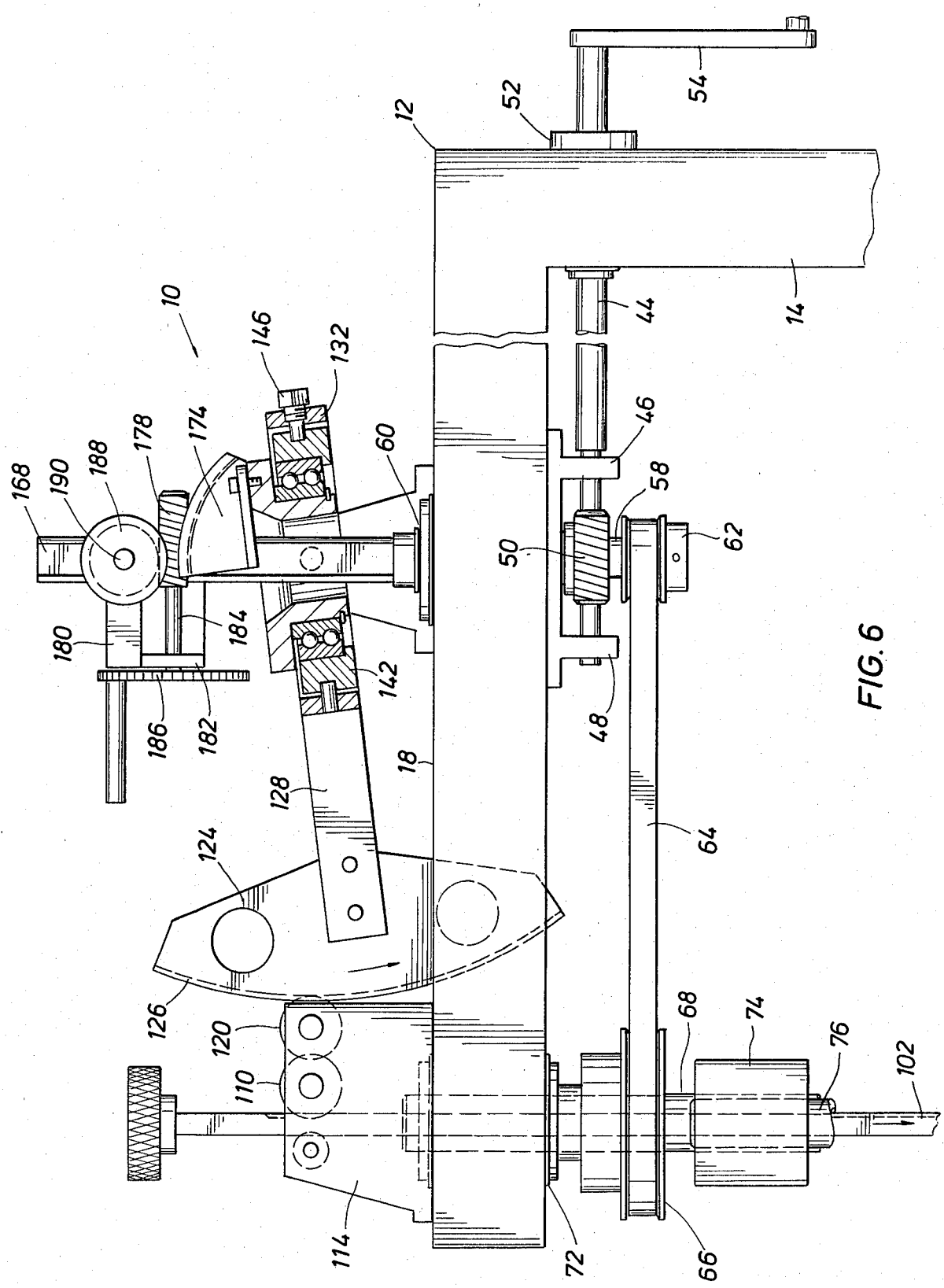

FIG. 6 is a partial elevational view of the upper portion of the apparatus of FIGS. 1 and 2 having portions thereof broken away and showing the two-cycle translational control features thereof in section.

Figure 6A:
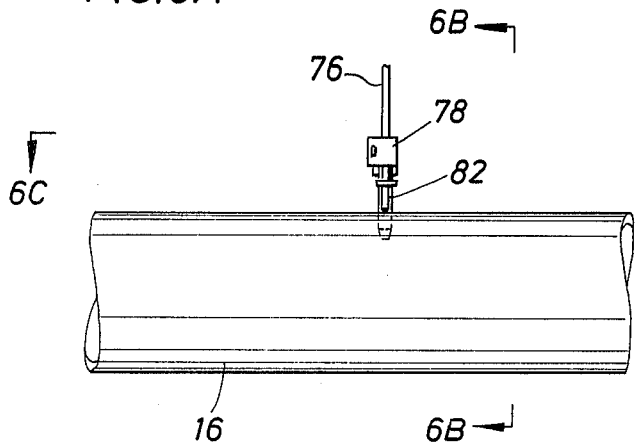

FIG. 6A is a pictorial representation illustrating the position of the torch and torch support structures of the apparatus when the mechanism is positioned as shown in FIG. 6.

Figure 6B:
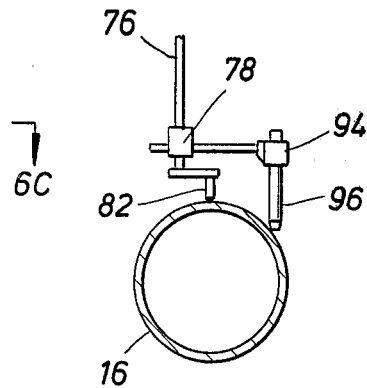

FIG. 6B is a sectional view taken through the pipe along line 6B—6B and illustrating the torch and torch rotational support apparatus in the position established with the mechanism positioned as shown in FIG. 6.

Figure 6C:
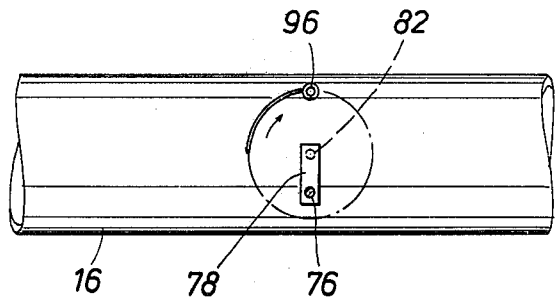

FIG. 6C is a sectional view taken along line 6C—6C, which shows the pipe in plan and shows the position of the torch and torch rotational control apparatus with the mechanism positioned as shown in FIG. 6.

Figure 7:
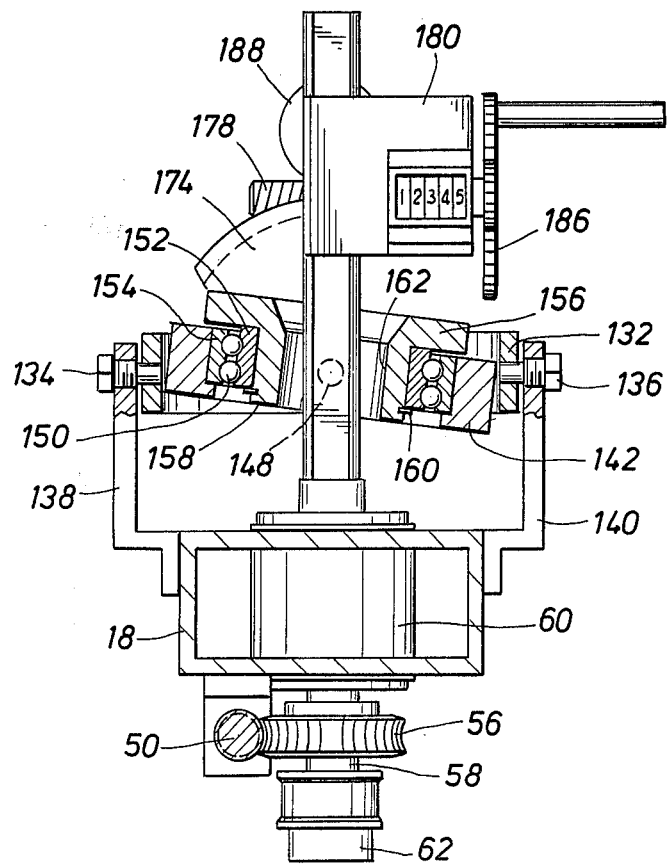

FIG. 7 is a partial sectional view of the apparatus shown in FIG. 2, illustrating the bearing and gimbal assembly positioned in 90° offset relation with respect to the position shown in FIG. 2.

DETAILED DESCRIPTION OF PREFERRED EMBODIMENT

Referring now to the drawings and first to FIG. 1 apparatus for cutting openings in pipes is shown generally at 10 which incorporates a frame structure 12 which is generally in the form of a support member 14 which is adapted to be positioned in substantially normal relation with respect to the centerline of a pipe 16. The frame structure also includes a support member 18 which is positioned in substantially normal relation with support member 14 and which may be connected to or formed integrally with support member 14 as desired. It is desirable to secure the apparatus 10 to a pipe 16 in such a manner that the frame structure 12 thereof is in substantially immovable relation with the pipe. According to the present invention this feature may be effectively accomplished by means of a quick disconnect type coupling shown generally at 20 which incorporates a pair of saddle elements 22 and 24 which are secured in assembly by means of an intermediate connector element 26. The saddle elements 22 and 24 define generally V-shaped notches or recesses as shown in broken line at 28 and 30. These notches are disposed in accurate registry such that when the pipe surface is received in seated relation within the notches, the frame structure 12 will be accurately oriented with support member 14 in normal relation with the centerline of the pipe and frame member 18 in parallel relation with the centerline of the pipe. An intermediate structural support 32 is secured to member 26 and provides rotary support for a shaft member 34 having a hand crank 36 in assembly therewith. At the opposite end of the shaft member 34 is provided a yoke defined by a pair of spaced strap winding projections 38 which receive a flexible strap member 40 in interlocked assembly therebetween. The strap member is taken up by the winding projections of the yoke in such manner that tensioning is equalized in both sides of the pipe. This force balanced strap tensioning feature allows the saddle elements to be drawn into tight immovable relation with the pipe while at the same time preventing the saddles and frame from being drawn out of proper position relative to the pipe. A latch member 42 is also secured to the structural support 32 and functions to lock the rotary shaft 34 against counter rotation. The latch member 42 may be in the form of a ratchet and pawl arrangement is desired. In order to secure the frame member 12 in releasable but immovable relation with the outer surface of the pipe 16 the flexible strap 40 is extended around the pipe and then brought into assembly with the spaced projections 38 in the manner shown. The crank element 36 is then rotated manually to tighten the strap 40 as tight as is appropriate for retention of the frame member in immovable relation with the pipe. The spaced winding elements take up the strap extremities equally and, when tightening, cause tension to be applied equally to each side of the strap. The saddle thus remains stationary as the strap is tightened. As the shaft 34 is rotated the latch element 42 is operative to prevent counter rotation of the shaft 34. Upon tightening of the retainer strap 40 the crank 34 is then released. As the shaft 34 tends to counter rotate, the ratchet and pawl arrangement of the latch 42 will prevent such counter rotation. The strap 40 will thereby secure the frame member 12 in the position shown in FIG. 1. Release of this position is accomplished simply by manual lifting of the pawl member from the ratchet, thereby releasing the shaft 34 for counter rotation. After the retainer strap 40 has been loosened it may be removed from the spaced projections 38 to thus release the frame member for separation from the pipe.

It should be borne in mind that the quick disconnect retainer mechanism 20 is effective to support the frame member 12 in any desired orientation relative to the pipe. For example, the frame member 12 is shown in vertical orientation with pipe in FIG. 1. By rotating it 90° or 180° from the position shown in FIG. 1, the pipe opening will be formed in the side wall or bottom wall of the pipe. For purposes of simplicity however, the frame member is discussed herein in conjunction with the position shown in FIG. 1. It should be borne in mind that this particular position is in no way restrictive of the spirit and scope of the present invention.

For optimum cutting of pipe openings in a pipe, it is necessary for a cutting torch to be revolved in an arc of 360°. During such movement, it is also necessary that the torch have two-cycle linear movement to thus allow the tip of the torch to be maintained in optimum spaced relation with the outer surface of the pipe for efficient metal cutting. It is further desired that rotational movement of the torch and linear oscillation of the torch be accomplished by a single drive mechanism thereby ensuring accurate tracking of the cutting tip of the torch relative to the cylindrical surface of the pipe as the torch is rotated. These features are efficiently accomplished according to the present invention through the torch rotational control and tracking control mechanisms which are each depicted in detail in FIG. 2. For operation of both the torch rotational movement and two-cycle torch oscillation, a single drive shaft 44 is secured in rotatable relation to the frame 12. At one extremity of the shaft 44, the shaft is journalled for rotation by means of journals 46 and 48 and supports a worm gear 50 between the journals. The shaft 44 is also journalled for rotation by means of a journal 52 which is provided in the support member 14 of the frame 12. At the outer extremity of the shaft 44 is provided a crank member 54, enabling the shaft to be rotated manually. Although the shaft 44 is adapted for manual rotation as shown it should be borne in mind that any suitable power energized mechanism may be employed for accomplishing rotation of the shaft. For example, an electric motor may be provided with a suitable gear train for accomplishing rotation of the shaft 44 at a desired speed for movement of the torch at its optimum cutting speed. The motor mechanism for driving the shaft may be a variable speed motor, thus enabling service personnel to adjust the speed of the motor according to the diameter of pipe to be cut, pipe thickness, etc.

As shown particularly in FIGS. 2, 4, 5 and 6, the worm gear 50 is maintained in driving relation with a mating worm gear 56 which is secured in nonrotatable relation to a tracking control spindle or shaft 58. The shaft 58 is rotatably supported by a bearing assembly 60 which is secured to the horizontal support member 18 of the frame. A pulley member 62 is secured in nonrotatable relation to the lower portion of the shaft 58 as shown in FIG. 2 and a drive belt 64 is received by the pulley 62 and is also received by a pulley 66 which is secured in nonrotatable relation to a torch rotation drive spindle or shaft 68. The shaft 68 is of tubular form defining an elongated guide passage 70 and is supported in rotatable relation relative to the horizontal support member 18 of the frame by means of a bearing assembly 72. As the drive shaft 44 is rotated the worm gear drive arrangement 50–56 imparts rotation to the tracking control spindle 58 thus rotating the pulley 62. Through the drive belt 64 the pulley 66 is also rotated thereby accomplishing simultaneous rotation of the torch rotation drive spindle 68. The pulley 66 is of larger diameter as compared with the diameter of pulley 62 and are relatively sized such that a single rotation of the pulley 66 is accomplished by two rotations of the pulley 62. Thus, the tracking control spindle or shaft 58 rotates at twice the speed of the torch rotation drive spindle 68.

A torch support block 74 is secured in nonrotatable relation with the spindle 68 and provides support for a torch guide post 76. The torch guide post provides guiding support for a torch guide block 78 which is slidable in linearly guided relation along the length of the torch guide post. A locator support element 80 is secured in nonrotatable relation to the lower extremity of the torch guide post 76 as shown in FIG. 1 and is formed to define a threaded aperture which is positioned in coaxial relation with the axis of rotation of the torch rotation drive spindle. An externally threaded locator element 82 is received by the threaded aperture and defines a point 84 at one extremity thereof. When it is desired to cut a pipe opening, the center of the pipe opening is located and a punch will typically be employed to form a center point in the pipe. The point 84 of the locator element 82 is typically received at the center point to thus provide an axis of rotation for the torch. It should be borne in mind that it is not necessary to actually form a center point depression for the locator point 84. If desired the locator point 84 may simply be positioned at the desired center point which has been located on the pipe. The frame structure 12 and the components rotated relative to the frame structure are of sufficient rigidity as to maintain the center point 84 of the locator element in precisely positioned relation with the pipe during the cutting operation.

The torch guide block 78 defines a transverse opening as shown in broken line at 86 in FIG. 1 through which extends a torch locator arm 88 having rack teeth 90 formed thereon. A pinion gear 92 also shown in broken line in FIG. 1 is rotatably supported by the torch guide block 78 and is in driving engagement with the rack teeth 90 of the torch locator arm. The pinion gear 92 is rotated to achieve selected positioning of the torch locator arm 88 relative to the guide block 78. Although a rack and pinion arrangement is shown for positioning of the torch locator arm, the present invention is by no means restricted to this particular type of torch location. For example, the torch locator arm 88 may simply be in the form of an elongated rod of sufficient length which is in sliding relation with a guide passage extending through the torch guide block. Any suitable means of locking may be employed to achieve locking of the torch locator arm in a position maintaining the torch at its properly spaced relation relative to the torch locator element 82.

At one extremity of the torch locator arm 88 is provided a torch receptacle 94 which is adapted to receive an oxyacetylene torch 96 in immovable relation therewith. The torch 96 is provided with a cutting tip 98 which is intended to be positioned in accurately spaced relation with respect to the outer surface of the pipe 16 in order to cut an accurate opening by means of oxyacetylene cutting. The torch 96 includes torch adjustment means 100 which may be manually manipulated in order to accomplish optimum positioning of the cutting tip 98 relative to the surface of the pipe. The cutting torch 96 may be any one of a number of different commercially available types within the spirit and scope of the present invention.

As the drive shaft 44 is rotated, as explained above, the tracking control spindle and torch rotation drive spindle are rotated at different relative speeds. As the torch rotation drive spindle is rotated the torch support block 74 is rotated and the offset torch guide post 76 is revolved about the axis of the spindle 68. This activity of course causes the torch guide block also to be rotated about the axis of the spindle 68 thus accomplishing rotation of the torch locator arm and the torch about the common axis of the spindle 68 and the torch locator element 82. During such rotation, with the cutting torch 96 activated, the oxyacetylene cutting flame will cut a very smooth opening in the pipe 16, the diameter of such opening being controlled by the position of the torch locator arm 88 as supported by the guide block 78 in relation to the axis of rotation defined by the torch rotation drive spindle and the locator element 82.

As the torch is rotated about its axis of rotation, in order to cause the cutting tip 98 of the torch to maintain accurate predetermined spacing with the outer surface of the pipe as the torch is rotated, it is necessary for the torch to have components of vertical movement simultaneous with torch rotation. The torch must in fact have two cycles of vertical movement for every single revolution of the cutting torch 96. As mentioned above, the tracking control spindle or shaft 58 is rotated at twice the speed of the torch rotation drive spindle. The pipe cutting mechanism is provided with means for translating the rotary motion of the tracking control spindle 58 into two cycles of linear movement, which linear movement is induced to the torch guide block 78 to thus cycle the torch linearly during its pipe cutting rotation.

As mentioned above, the torch rotation drive spindle 68 is of tubular form defining an elongated guide passage 70. A tracking control rod 102 is extended through the passage 70 of the spindle 68. The torch guide block 78 is provided with a connector projection 104 which is received by a connector structure 106 provided at the lower extremity of the tracking control rod. The tracking control rod is formed to define a rack segment 108 along the length thereof forming a plurality of rack teeth. The rack teeth of the rack section 108 are maintained in driven relation with a pinion gear 110 which is mounted for rotation about a gear shaft 112. The gear shaft 112 extends from a gear support block 114 which extends upwardly from the transverse frame support member 18. An idler roller 116 is also rotatably supported by the gear support block 114 and engages a surface 118 of the tracking control rod 102 and thus counteracts the thrust applied to the rack section 108 by the pinion gear 110. The pinion gear 110 is positioned in driven engagement by means of a second pinion gear 120 which is rotatably supported by a shaft 122 extending from the gear support block 114. An arcuate rack head 124 is provided having an arcuate rack section 126 defined thereon which presents gear teeth of the rack section in driving engagement with the teeth of the pinion gear 120. An elongated translation arm structure 128 is provided which is secured to the rack head 124 and which is pivoted about a pivot point 130 which is the center point or axis of rotation of the arcuate rack section 126 of the rack head. As the translation arm is pivoted upwardly about the axis 130 as shown in FIG. 2, the gear train involving arcuate rack section 126, pinion gears 120 and 110, and the linear rack section 108 of the tracking control rod induce upward movement of the tracking control rod. Upon downward pivoting of the translation arm 128 this gear train causes downward movement of the tracking control rod.

It is necessary to convert the rotary motion of the tracking control spindle 58 into two-cycle oscillational movement of the translation arm 128 during each revolution of the cutting torch 96. In accordance with the present invention this feature is effectively accomplished by providing a bearing and gimbal mechanism which is interconnected with the tracking control spindle and the translation arm 128. As shown particularly in FIGS. 2, 6 and 7, the translation arm 128 defines a support ring portion 132 which is maintained in pivotal relation about the axis of rotation 130 by means of pivot elements 134 and 136 which are secured to respective support standards 138 and 140. The support standards 138 and 140 are secured in any suitable manner such as by bolting or welding to the transverse frame member 18. This pivotal interconnection is also readily apparent from the plan view of FIG. 3. A bearing support ring 142 is located in movably relation within the support ring 132 and is positioned for axial rotation relative to the support ring by means of pivot elements 144 and 146 thus allowing the bearing support ring freedom of pivotal rotation about an axis 148 as shown in FIG. 7. The bearing support ring 142 provides support for a bearing assembly 150 having inner and outer bearing races 152 and 154 with bearing elements rotatably supported therebetween. The inner race 152 of the bearing assembly is seated against a flange portion 156 of an inner drive element 158 and is secured in its seated position by means of a retainer ring 160. The inner ring element 158 is formed to define a central opening 162 through which the upper portion of the tracking control spindle 58 extends. The upper portion 164 of the central opening 162 is flared to thus permit considerable angular relationship of the translation adjustment element 158 relative to the tracking control spindle. It should be borne in mind that the translation adjustment element 158 must rotate along with the tracking control spindle. To accomplish this feature the tracking control spindle is formed to define flat surfaces 166 and 168 on opposed sides thereof which are received in closely spaced driving relation with flat surfaces 170 and 172 which are formed by the opening 162. These cooperatively related flat surfaces establish a rotating drive relationship between the upper portion of the tracking control spindle and the translation adjustment element.

With the translation adjustment element 158 maintained in inclined relation with the tracking control spindle and with rotation thereof induced by rotation of the tracking control spindle, the gimbal type support thereof defined by pivotally interrelated rings 132 and 142, induce oscillation of the translation arm 128 about its axis of rotation 130. Oscillation of the translation arm 128 will induce oscillation of the arcuate rack head 124, thus causing the arcuate rack section 126 thereof to induce cyclical rotation and counter rotation of the gear train to produce upward and downward linear oscillation of the tracking control rod. The distance of movement of the tracking control rod during its oscillation is therefore controlled by the angular relationship of the translation adjustment element 158 to the tracking control spindle. It is desirable therefore to control positioning of the angular relationship of the translation adjustment element 158 to the tracking control spindle in accordance with a selected size of pipe to be cut and in accordance with the size of opening to be cut in the pipe. This feature is effectively accomplished in accordance with the present invention by providing an arcuate worm gear segment 174 having worm gear teeth 176 in engagement with a worm gear element 178. A support member 180 is secured to the upper portion of the tracking control spindle and includes a drive support portion 182 thereof within which a worm drive shaft 184 is journalled for rotation. The worm gear element 178 is secured to the worm drive shaft 184. An adjustment crank 186 is secured to the shaft 184 and is adapted for manual rotation of the shaft. An idler gear 188 is rotatably secured by a shaft 190 to the tracking control spindle and provides thrust support for the worm gear element 178. As the crank element 186 is rotated its shaft 184 induces driving rotation of the worm gear element 178. The worm gear element 178 in turn reacts with the rack teeth 176 of the rack segment 174. As the rack segment 174 is moved by the worm gear mechanism, the angular position of the translation adjustment element 158 is changed. The rack segment 174 is arranged such that its axis of rotation is coincident with the axis of rotation of the translation arm 128. Thus, the angular position of the translation arm 128 is also adjusted as the rack segment 174 is adjusted by the worm gear mechanism.

It is desirable to provide the user with a visual indication of the particular setting of the translation adjustment element and thus provide a visual indication of the particular pipe size and pipe opening for which the apparatus is set. This feature is effectively accomplished in accordance with the present invention by providing the apparatus with a visual indicia mechanism 192 which is supported by the support structure 180 and which is maintained in driven relation with the apparatus such that rotation of the crank element 186 and worm drive shaft 184 induces rotation of indicia wheels 194. The indicia wheels provide a visual representation of the particular position of the crank element 186. The crank element is provided with outer gear teeth 196 which are in driven relation with a pinion gear 198 which drives the indicia mechanism. The user of the pipe cutting mechanism will be provided with a chart which identifies pipe sizes including the pipe in which a hole is to be cut, which may be referred to as the "run," and the size of the opening to be cut therein for a "branch" pipe to be welded to the run. The chart will illustrate a numerical designation for the run and branch pipe sizes. For example, if a branch pipe of 8" diameter is to be welded to a run pipe having a diameter of 10", the crank element 186 will be rotated until the indicia mechanism displays the number "352." For other run and branch pipe sizes, the numerical designation will of course differ. It should be borne in mind that the number "352" is only representative of a particular chart of a pipe cutting mechanism having parts of specific dimension. As these parts change in dimension the chart will also change in its numerical designation. The use will simply install the apparatus on the run pipe, position the point 84 of the locator element 82 at the center of the opening to be cut and then set the mechanism to properly cut this opening by dialing in the proper numerical indicia 194 of indicia mechanism 192. This is accomplished simply by rotating the crank element 196 until the proper indicia are displayed. The numerical indicia merely indicates the precise position of the pivotal translation arm 128 relative to a particular reference. In doing so, the indicia reflects the precise angular oscillation of the arcuate rack head 124, thus indicating precise linear oscillation of the tracking control rod 102.

It should be noted that the shaft 122 supporting pinion gear 120 is capable of moving linearly as well as being rotatable. The shaft 122 is provided with a manual control knob 200 at one exteremity thereof and is urged to the FIG. 3 position by means of a compression spring 202. In absence of manual force therefore, the compression spring 202 maintains the shaft 122 in the position shown in FIG. 3. When it becomes desirable to alter the geared relationship of the pinion gear 120 with the arcuate rack segment 126 of rack head 124, manual force is applied to the knob 200 thereby shifting shaft 122 linearly against the compression of the spring 202. When this occurs the teeth of the pinion gear 120 are moved out of registry with the teeth of the rack segment 126. After the shaft 122 has been shifted in this manner the adjustment knob 200 may be rotated thereby rotating the gear train and thus allowing accurate positioning of the tracking control rod to thus position the torch guide block 78, the torch locator arm 88 and the torch 96 as desired to position the torch tip in desirably spaced relation with the pipe 16 to be cut. While this is being accomplished, it is also possible to adjust the position of the rack head 124 by rotating the crank 186 in a selected direction. With the rack head properly positioned and the tracking control rod positioned as desired, force on the control knob 200 is released thereby causing the compression spring 202 to shift the shaft and its pinion gear 120 linearly thus positioning the pinion gear in engaging relation with the gear teeth of the rack segment 126. The mechanism is thus properly set for accomplishing a pipe cutting procedure.

OPERATION

In FIG. 2, the whole cutting mechanism is shown with the rack head 124 at the upper limit of its cyclical angular movement. In FIGS. 2A, 2B and 2C the cutting torch and its support and rotation mechanism is shown in relation to the pipe in the position established with the mechanism as shown in FIG. 2. The locator element is in engagement with the pipe 16 at the center point of the opening to be cut in the pipe. With the rack head 124 in its full up position the torch 96 will be positioned by the guide post 76, the torch guide block 78 and the locator arm 88 with the cutting tip of the torch in alignment with the top center portion of the pipe as is more clearly evident from FIGS. 2B and 2C. In this position the tracking control rod 102 is obviously in its full up position as determined by the precision setting of the translation arm 128 as indicated numerically by the indicia mechanism 192.

As shown in FIG. 5, the rack head 124 has moved downwardly from the position shown in FIG. 2 to a position where the translation arm 128 is substantially parallel with the transverse support member 18 of the frame 12. In other words, the translation arm 128 has moved halfway through its angle of pivotal oscillation. Likewise, the tracking control rod 102 has moved downwardly half of its controlled linear distance. Likewise, the cutting torch 96 has also moved downwardly by half of its controlled linear distance, in addition. As shown in FIGS. 5A, 5B and 5C the cutting torch will have rotated 45° from the position shown in FIG. 2C. This movement is more clearly evident from FIG. 5C. Downward movement of the torch 96 is more clearly reflected in FIGS. 5A and 5B. In this position the cutting tip of the torch remains precisely positioned with respect to the outer surface of the pipe, accurately tracking the outer surface of the pipe during movement from the position shown in FIG. 2C to the position shown in FIG. 5C.

Downward movement of the rack head 124 continues until the translation arm 128 and the rack head 124 reach the downward limit of its cycle of angular movement as shown in FIG. 6. When this is accomplished, the torch support and positioning mechanism will have moved the torch another 45° from the position shown in FIG. 5C to the position shown in FIG. 6C, such position being reflected in FIGS. 6A, 6B and 6C. As the arcuate rack head 124 is moved by the translation arm 128 from the FIG. 2 position to the FIG. 5 position and then to the FIG. 6 position the cutting torch 96 will have moved through an arc of 90°. During this 90° arc of rotation of the cutting torch the arcuate rack head 124 and its gear train relationship with the tracking control rod 102 will have moved the tracking control rod from its full up position to its full down position. Moreover, such movement will be controlled by the gimbal mechanism of the translation arm in relation to the precise setting determined by the arcuate adjustment rack 174 and its relation with the worm gear 178.

Thus, as the torch is rotated through an arc of 90°, it is translated downwardly in accurately controlled relation with respect to the dimension of the pipe being cut and the size of the opening being cut in the pipe. During this arcuate movement of the torch therefore the cutting tip always remains in precision spaced relation with the outer surface of the pipe and cuts a 90° arc in the pipe.

With the rack head in its full down position as shown in FIG. 6 the shaft 44 continues to rotate and the gimbal mechanism, because of its setting, begins upward translation of the rack head 124 thus moving the translation arm 128 from its downward limit as shown in FIG. 6 towards its upper limit as shown in FIG. 2. During this movement the torch 96 will again be rotated through an arc of 90° but upward movement of the rack head 124 will induce consequent upward movement of the tracking control rod 102. Thus, the torch 96 will be moved upwardly through the next 90° increment of arcuate movement from the position shown in FIG. 6C. At this point the translation arm 128 and the rack head 124 will have completed one cycle of pivotal oscillation. By virtue of the ratio between pulleys 62 and 66 the torch rotation drive spindle 68 will have moved only through one-half cycle of rotary movement. The cutting torch will therefore have moved through an arc of 180° thus making only one-half of its complete pipe cutting revolution. As rotation of the shaft 44 continues the translation arm 128 will be subjected to another cycle of angular oscillation while the cutting torch will be moved through another one-half cycle of rotary movement thus completing its circular cut of the pipe opening.

In view of the foregoing, it is clear that I have developed a unique mechanism for cutting holes in pipes which is capable of being manufactured of lightweight construction for ease of handling by one person and for efficiency of use either in a shop environment or in the field. The apparatus is effectively designed for use either in upright condition, on its side or inverted thus facilitating the capability of cutting openings in pipes in any desired orientation for connection of other pipes thereto. I have also provided a mechanism which has the capability of being readily adjustable to particular sizes of pipes in which openings are to be cut and for cutting particular sizes of openings in the pipes. The apparatus is thus self-contained and does not require additional guiding features such as cams or pipe surface guides.

It is therefore seen that my invention is one well adapted to attain all of the objects and advantages hereinabove set forth together with other advantages which will become obvious and inherent from a description of the apparatus itself. It will be understood that certain combinations and subcombinations are of utility and may be employed without reference to other features and subcombinations. This is contemplated by and is within the scope of the present invention.

What is claimed is:

1. A mechanism for torch cutting openings and pipes comprising:
   (a) a frame structure adapted to be secured in immovable relation to the pipe in which the opening is to be cut;
   (b) locator means supported by said frame structure and establishing an axis of torch rotation relative to said pipe about which an opening is to be cut;
   (c) torch support means being linearly movable in transverse relation to the axis of torch rotation defined by said locator means and being adjustably positionable to position a cutting torch at a selected radius from said locator means to cut a pipe opening of selected dimension;
   (d) rotation means for accomplishing 360° revolution of said torch support means about said axis of rotation; and
   (e) pipe contour tracking means in common driven relation with said rotation means and inducing two cycle linear oscillation of said torch support means during each 360° revolution of said torch support means about said axis of rotation to maintain the cutting tip of a cutting torch secured to said torch support at a predetermined optimum cutting distance from said pipe during said 360° revolution.

2. A mechanism as recited in claim 1, wherein: said torch support means maintains circular orientation relative to said center point during rotation thereof, permitting a cutting torch to maintain parallel relation with the axis of rotation of said torch support means thus adapting the torch to make a cut parallel to intersection of a cylinder.

3. A mechanism as recited in claim 1, including: retainer means securing said frame structure in releasable immovable relation to the pipe to be cut.

4. A mechanism as recited in claim 1, wherein: a portion of said retainer means encircles said pipe and releasably secures said frame structure to said pipe, said retainer means permitting any selected orientation of said frame structure relative to said pipe and thus permitting openings to be cut at any selected location in the top, sides and bottom of said pipe.

5. A mechanism as recited in claim 1, wherein said rotation means comprises:
   (a) torch rotation drive means being rotatably supported by said frame structure and having an axis of rotation coaxial with said center point;
   (b) rotary drive means imparting rotation to said torch rotation drive means;
   (c) torch guide means being fixed to said torch rotation drive means and being rotatable therewith; and
   (d) said pipe contour tracking means having a tracking control element extending in guided relation through said torch rotation drive means, said contour tracking means imparting said two cycle linear oscillation to said torch support means during each 360° rotation of said torch rotation drive means.

6. A mechanism as recited in claim 5, wherein:
   (a) said torch rotation drive means defines guide means;
   (b) said tracking control element being an elongated tracking control rod being in guided linearly movable relation with said guide means; and
   (c) said contour tracking means imparting said two cycle linear oscillation to said tracking control rod during each 360° revolution of said torch rotation drive means.

7. A mechanism as recited in claim 6, wherein:
   (a) said tracking control rod defines an elongated rack; and
   (b) gear means having driving relation with said rack and inducing said two cycle oscillation to said tracking control rod.

8. A mechanism as recited in claim 7, wherein:
   (a) arcuate rack means is in driving relation with said gear means; and (b) gimbal means interconnects said arcuate rack means in driven relation with said rotary drive means and imparts two cycle pivotal oscillation of said arcuate rack means upon each revolution of said gimbal means.

9. A mechanism as recited in claim 8, wherein:

pipe dimension control means is incorporated with said gimbal means and is selectively positionable to control the angle of pivotal oscillation of said arcuate rack means to thus control the length of linear oscillation of said tracking control rod and adapt the torch to accurately track the curvature of different pipe sizes.

10. A mechanism as recited in claim 9, wherein:

numerical indicia is interconnected with said pipe dimension control means and provides a visual numerical indication representing the setting for selected pipe sizes.

11. A mechanism as recited in claim 8, wherein:

an elongated translation arm supports said arcuate rack head.

12. A mechanism as recited in claim 8, wherein said gimbal means comprises:
(a) a first gimbal element being fixed to said translation arm and defining a first axis of gimbal rotation relative to said frame means;
(b) a second gimbal element being movable relative to said first gimbal element about a second axis of gimbal rotation in normal relation with said first axis of gimbal rotation; and
(c) an inner drive element being rotatably supported by said second gimbal element and having driven relation with said contour tracking means.

13. A mechanism as recited in claim 12, wherein:
(a) bearing means supports said inner drive element for rotation relative to said second gimbal element;
(b) said contour tracking means includes a rotatable tracking control spindle supported by said frame means and defining drive surface means; and
(c) said inner drive element defines a central opening receiving said drive surface means of said tracking control spindle in movable driving relation therein.

14. A mechanism as recited in claim 13, wherein adjustment means is interconnected with said inner drive element and adjusts the angular position of said inner drive element and second axis of gimbal rotation relative to said tracking control spindle, said adjustment means being positionable to selected angular movement of said translation arm relative to said frame means and relative to the axis of rotation of said tracking control spindle.

15. A mechanism as recited in claim 1, wherein said torch support means comprises:
(a) a torch guide post;
(b) a torch positioning and guide block being in movable guided relation with said torch guide post and being movable in parallel relation with said axis of torch rotation; and
(c) torch locator means for supporting a cutting torch in laterally spaced relation from said axis of rotation and being selectively adjustable for the size of the opening to be cut.

16. A mechanism as recited in claim 15, wherein:
(a) said torch locator means is an elongated arm defining plural tooth means along the length thereof;
(b) said torch positioning and guide block includes gear means having driving relation with said plural tooth means of said elongated arm and being selectively movable to adjust the position of said elongated arm relative to said guide block; and
(c) torch receptacle means being secured to said elongated arm and providing support for a cutting torch.

17. A mechanism as recited in claim 15, wherein:
(a) said torch guide post is positioned in offset parallel relation with said axis of torch rotation; and
(b) locator means is supported by said torch guide post and defines locator point means coincident with said axis of torch rotation.

18. A mechanism as recited in claim 1, wherein:
(a) a torch rotation spindle is rotatably supported by said frame means;
(b) said cutting torch supporting means is secured in nonrotatable relation with said torch rotation spindle;
(c) a torch guide post is supported by said torch supporting means; and
(d) a torch guide block is guided for linear movement by said torch guide post and is moved linearly by said linear cycling means through said cycles of linear movement in correlated relation with cycles of torch revolution.

19. A mechanism as recited in claim 18, wherein:
(a) a tracking control spindle is rotatably supported by said frame means;
(b) a tracking control element is positioned for linear movement relative to said frame means and is connected to said torch guide block, said torch guide block being moved linearly on said guide post responsive to linear movement of said tracking control element; and
(c) translation means is supported by said frame means and translates rotary motion of said tracking control spindle into linear movement of said tracking control element.

20. A mechanism for torch cutting openings in pipe, comprising:
(a) frame means adapted for releasable attachment to a pipe in which a hole is to be cut about a circular axis;
(b) means for supporting a cutting torch and for revolving said cutting torch about an axis;
(c) linear cycling means for moving said torch through two cycles of linear movement for each revolution thereof about said axis; and
(d) adjustment means controlling the distance of said cycles of linear movement in accordance with the dimension of the pipe to be cut and the dimension of the opening to be cut in the pipe.

21. A mechanism as recited in claim 20, wherein said frame means includes:
(a) base means adapted for aligned interfitting relation with pipes of differing sizes;
(b) a flexible belt adapted to extend about the pipe;
(c) belt tightening means adapted for manual manipulation to tighten said belt about said pipe; and
(d) latch means for releasably securing said belt tightening means in the tightened position thereof.

22. A mechanism as recited in claim 21, wherein said belt tightening means comprises:
(a) saddle means adjusted for self-centering engagement with said pipe to be cut;
(b) shaft means being rotatably supported by said saddle means;
(c) a pair of spaced winding projections extending from said shaft and being oriented in substantially parallel relation with the centerline of said shaft; and (d) locking strap means adapted to extend about said pipe and being received by said winding projections in such manner that rotation of said shaft means tensions said strap about said pipe and applies substantially equal tension to each side of said strap.

23. A mechanism as recited in claim 20, wherein said cutting torch supporting means comprises:
   (a) means defining an axis of torch rotation;
   (b) a torch guide post;
   (c) a torch positioning and guide block being in movable guided relation with said torch guide post and being movable in parallel relation with said axis of torch rotation; and
   (d) torch locator means for supporting a cutting torch in laterally spaced relation from said axis of rotation and being selectively adjustable for the size of the opening to be cut.

24. A mechanism as recited in claim 23, wherein:
   (a) said torch locator means is an elongated arm defining plural tooth means along the length thereof;
   (b) said torch positioning and guide block includes gear means having driving relation with said plural tooth means of said elongated arm and being selectively movable to adjust the position of said elongated arm relative to said guide block; and
   (c) torch receptacle means being secured to said elongated arm and providing support for a cutting torch.

25. A mechanism as recited in claim 23, wherein:
   (a) said torch guide post is positioned in offset parallel relation with said axis of torch rotation; and
   (b) locator means is supported by said torch guide post and defines locator point means coincident with said axis of torch rotation.

26. A mechanism as recited in claim 20, wherein:
   (a) a torch rotation spindle is rotatably supported by said frame means;
   (b) said cutting torch supporting means is secured in nonrotatable relation with said torch rotation spindle;
   (c) a torch guide post is supported by said torch supporting means; and
   (d) a torch guide block is guided for linear movement by said torch guide post and is moved linearly by said linear cycling means through said cycles of linear movement in correlated relation with cycles of torch revolution.

27. A mechanism as recited in claim 26, wherein:
   (a) a tracking control spindle is rotatably supported by said frame means;
   (b) a tracking control element is positioned for linear movement relative to said frame means and is connected to said torch guide block, said torch guide block being moved linearly on said guide post responsive to linear movement of said tracking control element; and
   (c) translation means is supported by said frame means and translates rotary motion of said tracking control spindle into linear movement of said tracking control element.

28. A mechanism as recited in claim 27, wherein said translation means comprises:
   (a) a translation arm;
   (b) a gear train interconnecting said translation arm with said tracking control element, said gear train being activated upon movement of said translation arm and inducing said linear movement to said tracking control element; and
   (c) gimbal means interconnecting said tracking control spindle and translation arm, upon rotation of said tracking control spindle said gimbal means inducing angular oscillation of said translation arm.

29. A mechanism as recited in claim 28, wherein said gear train comprises:
   (a) linear rack means defined by said tracking control element;
   (b) arcuate rack means defined by said translation arm; and
   (c) pinion gear means being supported for rotation relative to said frame means and establishing driving interconnection between said linear rack means and arcuate rack means.

30. A mechanism as recited in claim 28, wherein said gimbal means comprises:
   (a) a first gimbal element fixed to said translation arm and defining a first axis of gimbal rotation relative to said frame means;
   (b) a second gimbal element being movable relative to said first gimbal element about a second axis of gimbal rotation in normal relation with said first axis of gimbal rotation; and
   (c) an inner drive element being rotatably supported by said second gimbal element and having nonrotatable driven relation with said tracking control spindle.

31. A mechanism as recited in claim 30, wherein:
   (a) bearing means supports said inner drive element for rotation relative to said second gimbal element;
   (b) said tracking control spindle defines drive surface means; and
   (c) said inner drive element defines a central opening receiving said drive surface means of said tracking control spindle in movable driving relation therein.

32. A mechanism as recited in claim 31, wherein adjustment means is interconnected with said inner drive element and adjusts the angular position of said inner drive element and second axis of gimbal rotation relative to said tracking control spindle, said adjustment means being positionable to selected angular movement of said translation arm relative to said frame means and relative to the axis of rotation of said tracking control spindle.

* * * * *